(12) United States Patent
Sakamaki

(10) Patent No.: US 9,385,919 B2
(45) Date of Patent: Jul. 5, 2016

(54) INFORMATION PROCESSING APPARATUS AND SETTING INFORMATION MANAGEMENT METHOD

(71) Applicant: FUJITSU LIMITED, Kawasaki-shi, Kanagawa (JP)

(72) Inventor: Kenji Sakamaki, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 315 days.

(21) Appl. No.: 13/955,685

(22) Filed: Jul. 31, 2013

(65) Prior Publication Data

US 2013/0318216 A1 Nov. 28, 2013

Related U.S. Application Data

(63) Continuation of application No. PCT/JP2011/052320, filed on Feb. 4, 2011.

(51) Int. Cl.
*G06F 15/16* (2006.01)
*H04L 12/24* (2006.01)
*G06F 21/88* (2013.01)

(52) U.S. Cl.
CPC ............ *H04L 41/0813* (2013.01); *G06F 21/88* (2013.01); *G06F 2221/2143* (2013.01)

(58) Field of Classification Search
CPC ..... H04L 41/08–41/0896; H04W 12/00–12/12
See application file for complete search history.

(56) References Cited

U.S. PATENT DOCUMENTS

| | | | |
|---|---|---|---|
| 6,658,562 B1* | 12/2003 | Bonomo | G06F 21/572 713/1 |
| 6,748,423 B1 | 6/2004 | Khanna et al. | |
| 2002/0052981 A1 | 5/2002 | Yasuda | |
| 2005/0033619 A1* | 2/2005 | Barnes | G06K 9/00 235/377 |
| 2005/0221800 A1* | 10/2005 | Jackson | H04M 1/72552 455/411 |
| 2006/0129669 A1* | 6/2006 | Kojima | H04L 41/082 709/223 |
| 2006/0235985 A1* | 10/2006 | Ramkumar | H04L 63/102 709/229 |
| 2007/0245404 A1 | 10/2007 | Okano | |
| 2008/0150677 A1* | 6/2008 | Arakawa | B60R 25/2018 340/5.2 |
| 2008/0238608 A1* | 10/2008 | Goldstein | G07C 9/00134 340/5.2 |

(Continued)

FOREIGN PATENT DOCUMENTS

| | | |
|---|---|---|
| JP | 2000-035947 | 2/2000 |
| JP | 2001-325171 | 11/2001 |

(Continued)

OTHER PUBLICATIONS

JPOA—Notice of Reason for Rejection dated Jul. 15, 2014 issued in the corresponding Japanese application No. 2012-555654,with English translation of the relevant part.

(Continued)

*Primary Examiner* — Brendan Higa
(74) *Attorney, Agent, or Firm* — Fujitsu Patent Center

(57) ABSTRACT

A setting information management method comprises: receiving a command related to setting information stored in a storage from a network, changing the setting information based on the command, changing the setting information based on an input from a user using a setting screen displayed by a display unit when the change of the setting information based on the command is invalid, and displaying, by using the display unit, the setting screen in a mode that the user is unable to change the setting information displayed on the setting screen when a change of the setting information based on the command is valid.

5 Claims, 9 Drawing Sheets

(56) References Cited

U.S. PATENT DOCUMENTS

| | | | | |
|---|---|---|---|---|
| 2010/0159831 | A1* | 6/2010 | Matsushima | G03B 7/00 455/41.2 |
| 2010/0159911 | A1* | 6/2010 | Childs | G06F 21/88 455/419 |
| 2010/0248720 | A1* | 9/2010 | Millet | H04W 12/06 455/435.1 |
| 2014/0004831 | A1* | 1/2014 | Yao | H04W 8/18 455/411 |

FOREIGN PATENT DOCUMENTS

| | | |
|---|---|---|
| JP | 2002-149297 | 5/2002 |
| JP | 2002-229798 | 8/2002 |
| JP | 2003-015781 | 1/2003 |
| JP | 2006-251945 | 9/2006 |
| JP | 2006-319405 | 11/2006 |
| JP | 2007-265023 | 10/2007 |
| JP | 2008-097485 | 4/2008 |

OTHER PUBLICATIONS

Notification of Transmittal of Translation of The International Preliminary Report on Patentability (Form PCT/IB/338, Form PCT/IB/373 & Form PCT/ISA/237), PCT/JP2011/052320, 8 pages, dated Aug. 15, 2013.

Sakamaki, Kenji et al., "Anti-Theft Solution for Mobile Personal Computers: CLEARSURE", FUJITSU. Mar. 2010, 61(2), pp. 94-99. English Abstract and Partial translation.

* cited by examiner

FIG. 2

| MEMORY ADDRESS | NAME OF SETTING | STATE DATA | LOCK FLAG | FIXATION FLAG |
|---|---|---|---|---|
| XXXXXX | "REMOTE LOCK/DELETION FUNCTION" | 0:OFF<br>1:ON | 0:OFF<br>1:ON | 0:OFF<br>1:ON |
| XXXXXX | "ACTIVATION WHEN WIRELESS SWITCH IS OFF" | 0:NOT ACTIVATE<br>1:ACTIVATE | | |
| XXXXXX | "ACTIVATION AT OUTSIDE COMMUNICATION RANGE" | 0:NOT ACTIVATE<br>1:ACTIVATE | | |
| XXXXXX | "LOCAL LOCK/DELETION FUNCTION" | 0:NOT USE<br>1:USE | | |
| XXXXXX | "LOCAL LOCK/DELETION OPERATION" | 0:LOCK<br>1:DELETE | | |
| XXXXXX | "UPPER LIMIT OF NUMBER OF TIMES PASSWORD CAN BE INPUT" | 3 | | |

INFORMATION PROCESSING APPARATUS AND SETTING INFORMATION MANAGEMENT METHOD

CROSS-REFERENCE TO RELATED APPLICATION

This application is based upon and claims the benefit of priority of the International Patent Application No. PCT/JP2011/052320, filed on Feb. 4, 2011, the entire contents of which are incorporated herein by reference.

FIELD

The disclosure relates to a management technique of setting information of an information processing apparatus.

BACKGROUND

Currently, portable information processing apparatuses called mobile personal computers, netbooks, and the like (hereinafter, simply written as "computers") are widely used, and opportunities of using the computers not only in the office, but also outside of the office, such as during transit and at the office of a customer, are increasing in business scenes. On the other hand, problems in the security of the computers are drawing attention. For example, when a computer is stolen or lost, personal information, customer information, and the like stored in the computer may be leaked.

Therefore, computers provided with functions of deleting or not allowing referencing information (data) stored in the computers and locking the computers by remote operation (hereinafter, written as "remote operation functions") are put into practical use. In such a computer, a communication module for wireless communication, such as a Personal Handyphone System (PHS) and a mobile phone, is capable of communication, regardless of an operating state of a Central Processing Unit (CPU), such as power off and suspended. As a result, when a Basic Input Output System (BIOS) wirelessly receives an instruction command from a remote location through the communication module, the BIOS deletes the data in a hard disk according to the instruction command even if an Operating System (OS) is not activated.

The BIOS is a program stored in a Read Only Memory (ROM), such as a flash memory, on a motherboard and executed at the activation of the computer, and the BIOS controls peripheral hardware, such as a disk drive and a video card. Therefore, the BIOS includes various pieces of setting information, such as setting of use or non-use of hardware, activation order setting, and power setting. A technique for changing the BIOS setting information by remote operation is also proposed.

Patent document 1: Japanese Patent Laid-Open No. 2002-229798
Patent document 2: Japanese Patent Laid-Open No. 2007-265023
Patent document 3: Japanese Patent Laid-Open No. 2000-035947
Patent document 4: Japanese Patent Laid-Open No. 2001-325171
Patent document 5: Japanese Patent Laid-Open No. 2003-015781
Non Patent document 1: Kenji Sakamaki, Hideyuki Nagatoshi, Masaki Mukouchi, Kazuaki Nimura, "Anti-theft Solution for Mobile Personal Computers: CLEARSURE", FUJITSU. 61, 2, p. 94-99, March 2010

The BIOS setting information may include a remote operation setting for switching whether to enable or disable the remote operation functions. In such a case, for example, the remote operation functions are set to "enabled (valid)" (ON) in a computer that can be carried outside of the office, and the remote operation functions are set to "disabled (invalid)" (OFF) in a computer fixed and operated in the office.

In general, the BIOS setting information is set according to an operational policy of the owner of the computer. For example, if the owner of the computer is a company, a management department of an information system determines the operational policy, and the user (employee) of each computer performs the BIOS setting of the computer of the user according to the operational policy.

However, in such an operation, since each employee takes charge of the BIOS setting, the BIOS setting may not be performed in accordance with the operational policy in a computer used by an employee who does not follow the operational policy, for example. As a result, if the computer is stolen and the remote operation functions need to be executed, the remote operation functions may not be able to be used.

To handle the problem, an operation of distributing computers to the employees is performed, the computers including BIOS setting information appropriately set by the information system manager. However, if an employee changes the setting of the BIOS setting information, the computer is not compatible with the operational policy after all.

There is a computer including a BIOS password to distinguish between the user who can change the BIOS setting information and the other users. According to the computer, an operation is possible, in which only the information system manager who knows the password changes the BIOS setting information, and general employees are not allowed to change the BIOS setting information.

However, in such an operation, if the BIOS setting information needs to be changed even slightly such as when the computer does not normally operate, the employee needs to hand over the computer to the information system manager. In other words, the information system manager needs to manage the operation, such as adjustment and repair, regarding all computers. Such an operation is unrealistic.

There is also a computer provided with functions such as the remote operation functions, in which a contract is signed with the user by setting a period of usage in advance at the time of purchase or at the start of usage. In such a computer, for example, the setting information related to the functions as a target of contract needs to be changed to "disabled". However, when the change of the setting information is dependent on the user, a trouble such as involuntary execution of the target functions may occur, if the user forgets the change operation.

SUMMARY

One of embodiments of the invention is an information processing apparatus, including:
a storage to store setting information;
a communication controller to receive a command related to the setting information transmitted from a network;
a first controller to change the setting information stored in the storage based on the command received by the communication controller; and
a second controller to change the setting information stored in the storage unit based on an input from a user using a setting screen displayed by a display unit, wherein the second controller controls the display unit so that the display unit displays the setting screen at a mode that the user is unable to change the setting information displayed on the setting screen when a change of the setting information based on the command is valid.

The other embodiment of the invention is at least one of setting information management method by using the information processing apparatus and a non-transitory computer readable medium executing a setting information management process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating a data structure example of BIOS setting information;

FIG. 6 is a diagram illustrating an example of a BIOS screen when a fixation flag is ON;

FIG. 7 is a diagram illustrating an example of the BIOS screen when the fixation flag is OFF and a lock flag is ON;

DESCRIPTION OF EMBODIMENTS

Hereinafter, an information processing apparatus (hereinafter, simply written as "computer") as an embodiment will be described with specific examples. The present invention is not limited to the configurations of the following examples.
<Embodiment 1>

Hereinafter, an embodiment 1 of the computer as an embodiment will be described.

[Apparatus Configuration]

Figure 1:
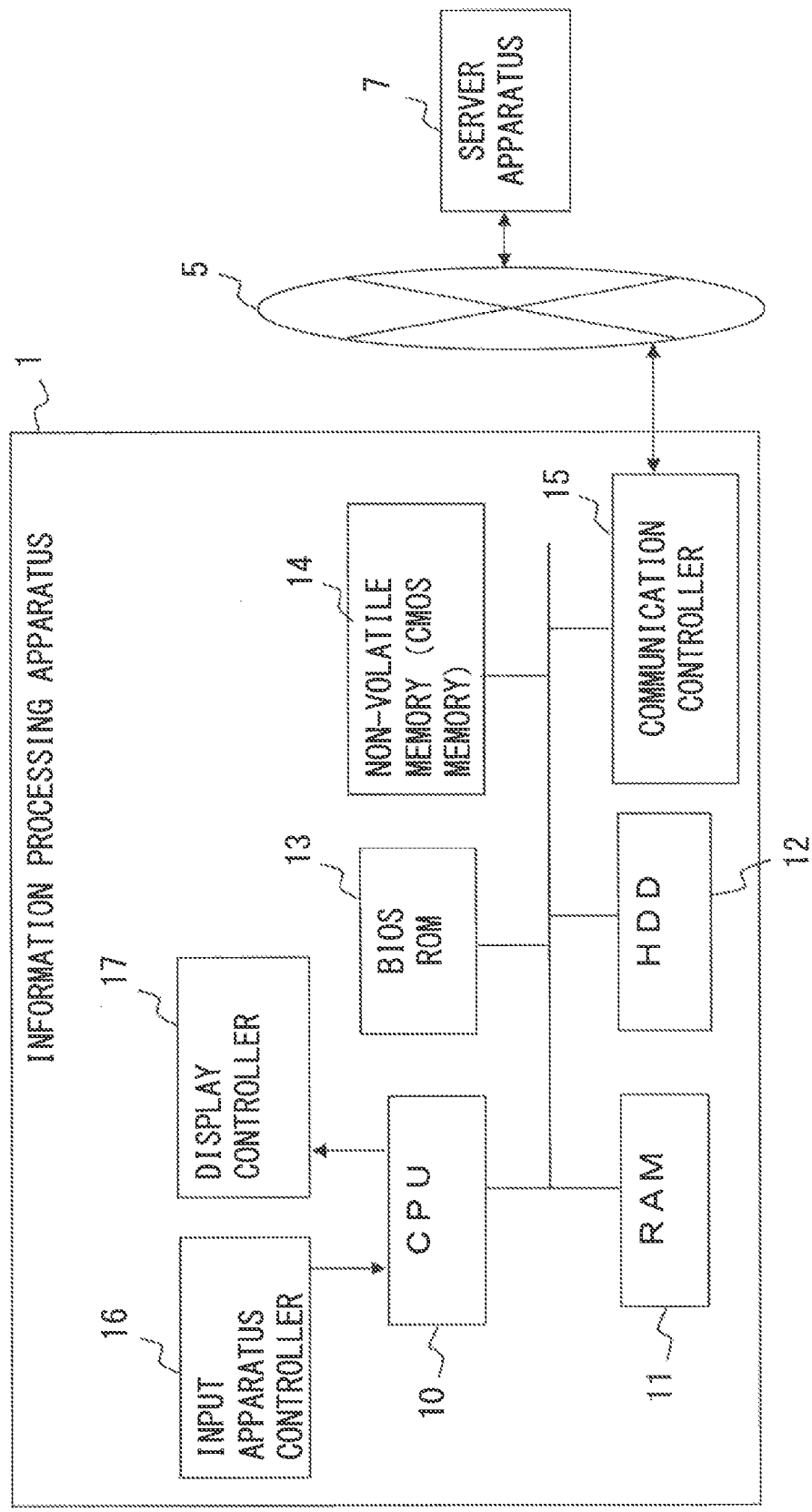
FIG. 1 is a diagram illustrating a hardware (H/W) configuration in a computer of a embodiment 1.

FIG. 1 is a diagram illustrating a hardware (H/W) configuration in a computer of the embodiment 1. A computer (information processing apparatus) 1 of the embodiment 1 is an information processing terminal, such as a so-called personal computer, and includes an input apparatus, such as a keyboard and a touch panel as user interfaces, a display monitor, and the like (not illustrated). The present embodiment does not limit the user interfaces.

The computer 1 includes, in the main body, a Central Processing Unit (CPU) 10, a Random Access Memory (RAM) 11, an Hard Disk Drive (HDD) 12, a BIOS-Read Only Memory (BIOS-ROM) 13, a non-volatile memory 14, a communication control unit (communication controller) 15, an input apparatus controller 16, a display controller 17, and the like. FIG. 1 illustrates only part of the configuration. Although FIG. 1 illustrates that the elements are connected on one bus, the elements are generally connected by a plurality of buses, such as Peripheral Components Interconnect (PCI) buses and Industrial Standard Architecture (ISA) buses.

The RAM 11 is a main storage apparatus. The HDD 12 is a storage apparatus (device) that stores user data, OS, various applications, and the like. The BIOS-ROM 13 is a storage apparatus that stores BIOS programs and is implemented by, for example, a flash ROM.

The display controller 17 is a display controller to control a display monitor. The display controller 17 generates a display signal according to display data sent from the CPU 10 and sends the display signal to the display monitor to display a desired screen. The input apparatus controller 16 receives an input signal corresponding to a user operation sent from the input apparatus and sends data according to the input signal to the CPU 10.

The CPU 10 is a processor that implements operation of the computer 1. When activated, the CPU 10 loads, on the RAM 11, a BIOS program stored in the BIOS-ROM 13 to execute the BIOS program. The CPU 10 further executes the OS (Operating System) and various applications stored in the HDD 12. Hereinafter, a thing implemented by the execution of the BIOS program will be written as "BIOS".

The CPU 10 controls the display controller 17 according to the BIOS, the OS, the applications, and the like to display various screens on the display monitor. The CPU 10 also receives, through the input apparatus controller 16, a user input to the screen displayed on the display monitor and executes a process according to the input.

The BIOS controls the connected hardware, such as the HDD 12, the input apparatus controller 16, and the display controller 17, according to BIOS setting information stored in the non-volatile memory 14. The BIOS is a program initially executed at the activation of the apparatus, and after a predetermined process is applied to the connected hardware, the BIOS carries out activation of the OS.

Meanwhile, when the BIOS receives a predetermined input through the input apparatus controller 16, the BIOS displays a setting screen (hereinafter, written as "BIOS screen") for displaying, on the display monitor, the BIOS setting information that is allowed to change. The predetermined input is, for example, a predetermined key input. The BIOS screen will be described later. The BIOS receives a user input to the BIOS screen through the input apparatus controller 16, and when the user input indicates change of the BIOS setting information, the BIOS updates the target BIOS setting information stored in the non-volatile memory 14.

The BIOS also receives a remote operation command transmitted from the other computer through the communication control unit 15 and updates the target BIOS setting information stored in the non-volatile memory 14 according to the content of the remote operation command.

The communication control unit 15 controls a communication module (not illustrated) for wireless communication, such as a PHS and a mobile phone. The communication module may be implemented separately from the communication control unit 15 or may be integrated with the communication control unit 15. The communication control unit 15 is connected to a battery (not illustrated) and is capable of operating the communication module regardless of the operating state of the main body of the computer 1. Hereinafter, the communication module and the communication control unit 15 may not be distinguished and may be collectively written as the "communication control unit 15".

The communication control unit 15 is connected to and capable of communicating with the other computer, such as a server apparatus 7, through a network 5, such as a wireless communication network and a public network. The server apparatus 7 is a computer for remotely operating the computer 1 in the embodiment 1. The server apparatus 7 transmits a predetermined remote operation command to the computer 1 in the embodiment 1 to remotely operate the computer 1.

The remote operation command is sent using an SMS (Short Message Service), for example. Specifically, a predetermined format for remote operation is determined, and the server apparatus 7 sends a message in the predetermined format to the computer 1. The present embodiment does not limit the method of implementing the remote operation command. The embodiment 1 illustrates an example in which a remote operation disable command, a remote operation disable fixation command, and a remote operation deletion command are provided as the remote operation commands.

When the remote operation command transmitted from the server apparatus 7 is received, the communication control unit 15 notifies the CPU 10 of the reception to transfer the remote operation command to the BIOS. When the communication control unit 15 receives a remote operation command when the CPU 10 is in a stopped state, such as a power-off state and a suspended state, the communication control unit 15 activates the CPU 10. Since the BIOS is executed when the CPU 10 is activated, the communication control unit 15 sends the received remote operation command to the BIOS.

The non-volatile memory 14 is a storage device implemented by a Complementary Metal Oxide Semiconductor (CMOS) or the like. Various pieces of BIOS setting information are stored in the non-volatile memory 14. The present embodiment does not limit the memory for storing the BIOS setting information to the CMOS memory. The BIOS setting information includes various settings related to the operating environment of the computer 1, such as settings related to the hardware including the keyboard, the display, the CPU, or the like, as well as settings, such as priorities of activated devices, system time, and used language.

In the embodiment 1, the BIOS setting information includes setting information related to locking and data deletion of the computer 1, such as (1) a remote lock/deletion function, (2) activation when the wireless switch is OFF, (3) activation at outside the communication range, (4) a local lock/deletion function, (5) a local lock/deletion operation, and (6) an upper limit of the number of times the password can be input. Hereinafter, the settings may be written as "lock-related settings". Each of the pieces of information (1) to (6) is an example of "a piece of setting information."

The remote lock/deletion function setting is a setting for whether to enable (valid) or disable (invalid) the remote operation functions. Therefore, hereinafter, the remote lock/deletion function setting may be written as a "remote operation setting". The setting for enabling the remote operation functions will be written as "ON", and the setting for disabling the remote operation setting will be written as "OFF". The remote operation setting can be remotely set to OFF from another computer by a remote operation disable command and a remote operation disable fixation command among the remote operation commands.

When the remote operation setting is set to OFF, the BIOS switches the communication control unit 15 to the stopped state, and a state of not receiving the remote operation command is set. The switch of the communication control unit 15 to the stopped state is implemented by stopping the power supply to the communication control unit 15, for example. When the remote operation setting is set to OFF, the other lock-related settings (activation when the wireless switch is OFF, activation outside of the communication range, local lock/deletion function, local lock/deletion operation, and upper limit of the number of times the password can be input) are disabled.

When the remote operation setting is set to ON, the communication control unit 15 sets the communication module to a standby state at all times. After determining whether the received command is the remote operation command, the communication control unit 15 transfers the remote operation command to the BIOS. Subsequently, the BIOS executes a process according to the content of the remote operation command. For example, when the remote operation command is the remote operation deletion command, the BIOS executes a process of deleting the data of the HDD 12 or a process of not allowing referring to the data of the HDD 12. The process of not allowing referring to the data is, for example, a process of deleting a key for decryption when the HDD 12 is encrypting the stored data.

The activation setting when the wireless switch is OFF is a setting indicating whether to activate the computer 1 when a hardware switch for switching the operating state (ON or OFF) of the communication control unit 15 is OFF. The user switches the hardware switch when the user enters a location where emission of radio waves is prohibited such as in a hospital and an airplane, for example. The activation setting outside of the communication range is a setting indicating whether to enable or disable the activation of the computer 1 when the computer 1 is positioned outside of the communication range.

The local lock/deletion function setting is a setting indicating whether to enable the function when a BIOS password is wrongly input for a predetermined number of times. The BIOS password is a password for accessing the BIOS setting information, and input of the BIOS password is prompted in changing the BIOS setting information. An operation mode when the local lock/deletion function setting is enabled and the BIOS password is wrongly input for the predetermined number of times is set to the local lock/deletion operation setting. For example, deletion of the data in the HDD or locking of the computer 1 is set for the operation mode. An upper limit of the number of times the input error of the BIOS password is permitted is set to the setting of the upper limit of the number of times the password can be input.

A setting name, state data, and the like are stored for each of these items in the BIOS setting information. FIG. 2 is a diagram illustrating a data structure example of the BIOS setting information. As illustrated in FIG. 2, for example, a character string "Remote Lock/Deletion Function" is stored as the setting name for the remote lock/deletion function setting, and a numerical value 0 indicating OFF or a numerical value 1 indicating ON is stored as the state data. Similarly, a character string indicating the setting name and state data are stored for each of the other remote operation settings. Although a natural language (such as ON and OFF) is used to write the state data of the items in the BIOS setting information, the state data as illustrated in FIG. 2 is stored in the non-volatile memory 14 as data that can be recognized by the computer 1.

By the way, the remote operation setting among the lock-related settings further includes a lock flag and a fixation flag. The lock flag and the fixation flag are used to switch whether to display the setting information of the lock-related settings on the BIOS screen in a change possible state. Each of the fixation frag and the lock flag is an example of "attached information." The fixation flag is set only by the remote operation disable fixation command, and once the fixation flag is set to ON, the lock-related settings are not allowed to change thereafter. When the fixation flag is set to ON, the remote operation setting is displayed on the BIOS screen in a change impossible state, regardless of the state of the lock flag. The lock flag is linked to the state data of the remote operation setting. The lock flag is set to ON when the remote operation setting is ON, and the lock flag is set to OFF when the remote operation setting is OFF. When the lock flag is set to ON, the setting information of the lock-related settings is displayed on the BIOS screen in the change impossible state.

[BIOS]

Figure 3:
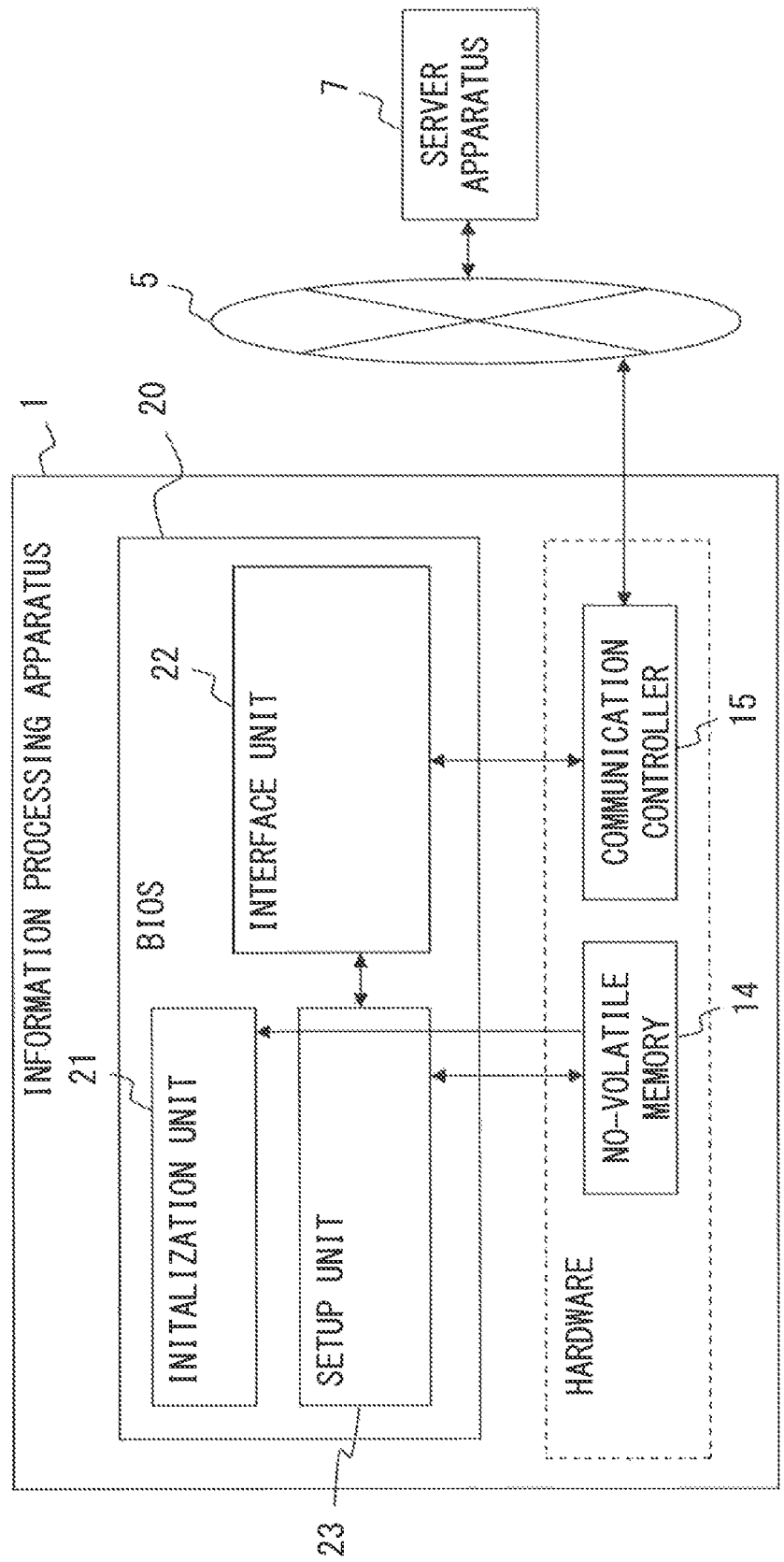
FIG. 3 is a block diagram illustrating a processing configuration of a BIOS.

FIG. 3 is a block diagram illustrating a processing configuration of the BIOS. As described, the CPU 10 executes the BIOS program to implement a BIOS 20 with the processing configuration as illustrated in FIG. 3. The BIOS 20 includes an initialization unit 21, an interface unit 22, a setup unit 23, and the like. These processing units are implemented as constituent elements of software called tasks, processes, threads, and the like.

The initialization unit 21 refers to the BIOS setting information stored in the non-volatile memory 14 to initialize the connected hardware. Since the initialization unit 21 can execute a process of a general BIOS, the description is simplified here.

The interface unit 22 analyzes the remote operation command sent from the communication control unit 15 and executes a process according to the content of the remote operation command. Specifically, when the remote operation command is the remote operation deletion command, the interface unit 22 executes a process of deleting the data in the HDD 12 or a process of not allowing referring to the data in the HDD 12.

When the remote operation command is the remote operation disable command, the interface unit 22 sets the state of the remote operation setting in the BIOS setting information to OFF to set the communication control unit 15 to the stopped state. As a result, the communication control unit 15 does not receive the remote operation command thereafter. When the remote operation command is the remote operation disable fixation command, the interface unit 22 sets the state of the remote operation setting to OFF and sets the fixation flag to ON to set the communication control unit 15 to the stopped state.

When a predetermined input is received through the input apparatus controller 16, the setup unit 23 sends the data of the BIOS screen to the display controller 17 to display the BIOS screen on the display monitor. To generate the data of the BIOS screen, the setup unit 23 reflects the BIOS setting information loaded from the non-volatile memory 14 on the screen data.

When the setup unit 23 loads the remote operation setting in the BIOS setting information, the setup unit 23 sets the lock flag to ON when the state of the remote operation setting is set to OFF and sets the lock flag to OFF when the state data is set to ON.

The setup unit 23 switches the display state of the setting information related to the lock-related settings on the BIOS screen according to the lock flag and the fixation flag of the remote operation setting. The display state indicates the change possible state or the change impossible state. The setup unit 23 generates data of the BIOS screen for displaying the setting information by the change possible state or the change impossible state and sends the data to the display controller 17.

The setup unit 23 receives a user input to the BIOS screen through the input apparatus controller 16, and when the user input indicates change of the BIOS setting information, the setup unit 23 updates the target BIOS setting information stored in the non-volatile memory 14.

[Operation Example]

Hereinafter, an operation example of the computer 1 in the embodiment 1 will be described.

Figure 4:
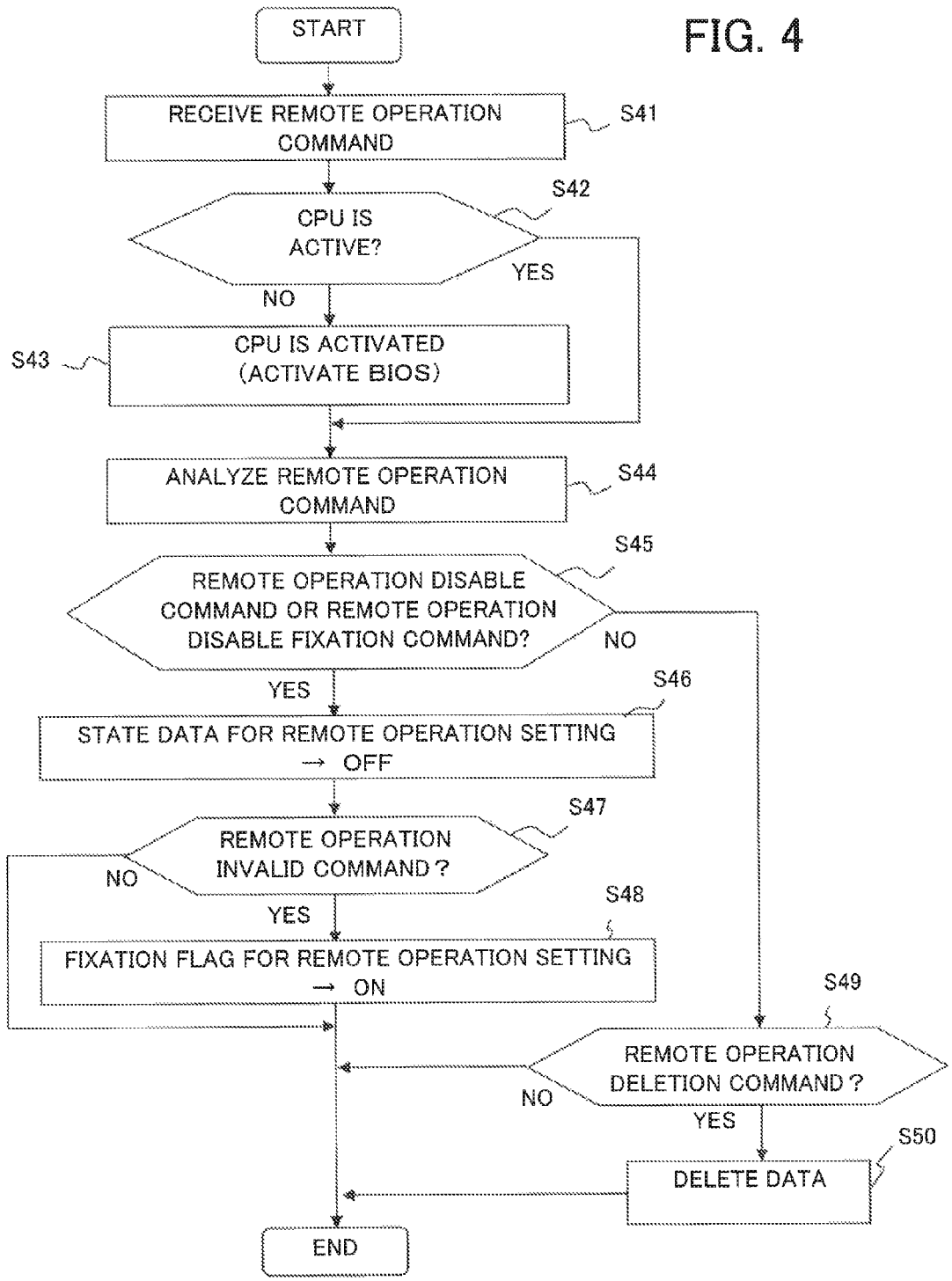
FIG. 4 is a flow chart illustrating an operation example at remote operation command reception.

FIG. 4 is a flow chart illustrating an operation example at remote operation command reception. When a remote operation command is transmitted from the server apparatus 7, the communication control unit 15 of the computer 1 receives the remote operation command (S41). The communication control unit 15 (including the communication module) is energized even when the CPU 10 is in the stopped state.

When the remote operation command is received, the communication control unit 15 determines whether the CPU 10 is activated (S42). When the CPU 10 is activated (S42; YES), the communication control unit 15 transfers the remote operation command to the BIOS 20. On the other hand, when the CPU is stopped (S42; NO), the communication control unit 15 activates the CPU 10 (S43). When the CPU 10 is activated, the BIOS 20 is activated.

In the BIOS 20, the interface unit 22 receives the remote operation command from the communication control unit 15. The interface unit 22 analyzes the remote operation command (S44). The interface unit 22 confirms that the remote operation command is the remote operation disable command or the remote operation disable fixation command (S45).

When the interface unit 22 confirms that the remote operation command is the remote operation disable command or the remote operation disable fixation command (S45; YES), the interface unit 22 sets the state of the remote operation setting in the BIOS setting information to OFF (S46). After setting the state of the remote operation setting to OFF, the interface unit 22 sets the communication control unit 15 to the stopped state.

The interface unit 22 further checks whether the remote operation command is the remote operation disable fixation command (S47). When the remote operation command is the remote operation disable fixation command (S47; YES), the interface unit 22 sets the fixation flag of the remote operation setting in the BIOS setting information to ON (S48).

When the interface unit 22 confirms that the remote operation command is not one of the remote operation disable command and the remote operation disable fixation command (S45; NO), the interface unit 22 determines whether the remote operation command is the remote operation deletion command (S49). When the remote operation command is the remote operation deletion command (S49; YES), the interface unit 22 executes a process of deleting the data or a process of not allowing referring to the data in the HDD 12 (S50).

In the operation example of the embodiment 1, the state of the remote operation setting is not checked when the remote operation command is received. This is because the state of the remote operation setting is set to ON when the remote operation command is received. However, the operating state of the communication control unit 15 may not be switched, and the state of the remote operation setting may be checked when the remote operation command is received.

Figure 5:
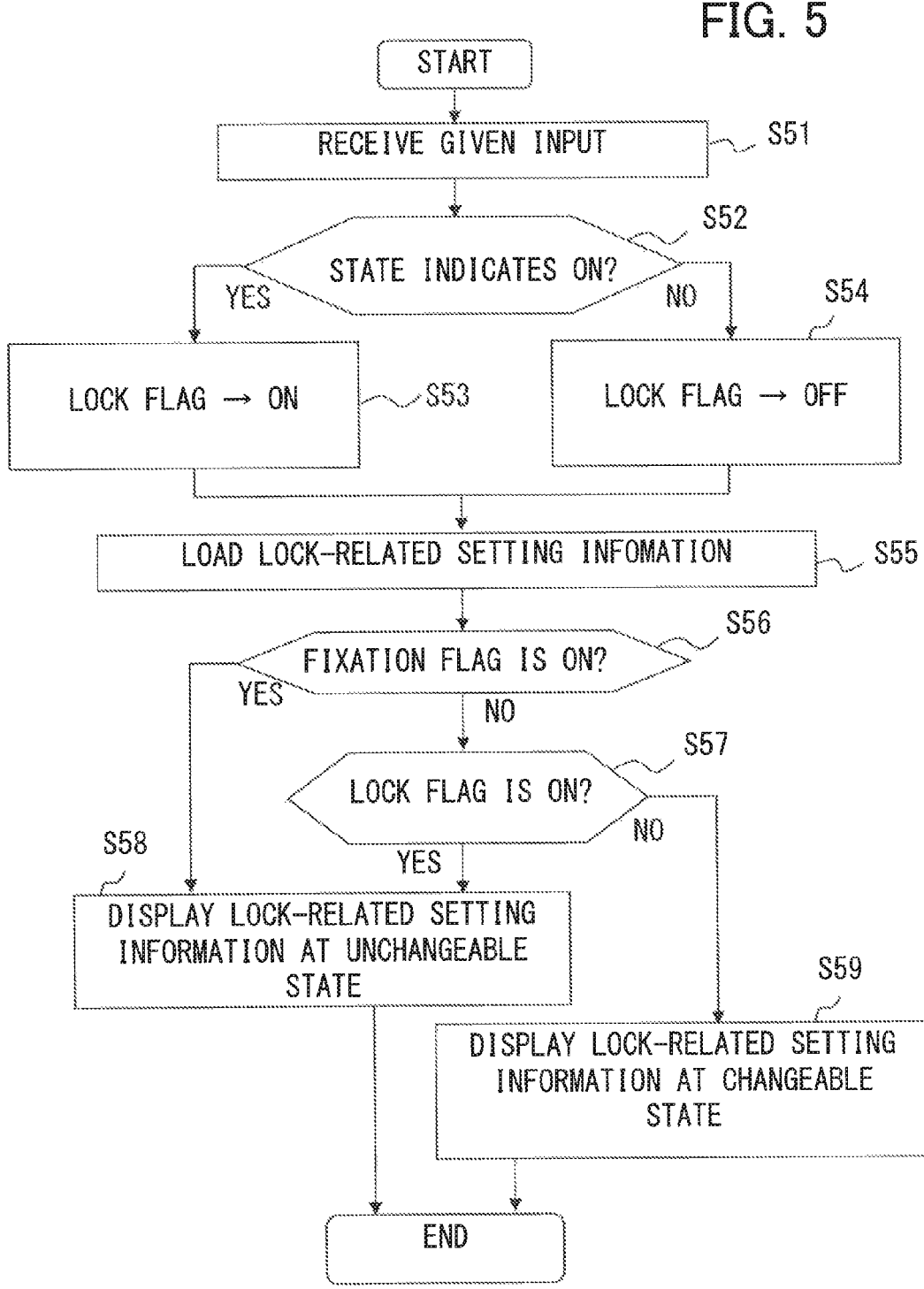
FIG. 5 is a flow chart illustrating an operation example at BIOS screen activation.

FIG. 5 is a flow chart illustrating an operation example at BIOS screen activation. When a predetermined input is performed from an input apparatus, such as a keyboard, during the activation of the BIOS 20, the BIOS 20 receives the input through the input apparatus controller 16 (S51). When the predetermined input is received, the BIOS 20 activates the setup unit 23.

The setup unit 23 refers to the remote operation setting in the BIOS setting information (S52). When the state of the remote operation setting indicates ON (S52; YES), the setup unit 23 sets the lock flag of the remote operation setting to ON (S53). On the other hand, when the state of the remote operation setting indicates OFF (S52; NO), the setup unit 23 sets the lock flag of the remote operation setting to OFF (S54).

When the setting of the lock flag of the remote operation setting is finished, the setup unit 23 loads the lock-related setting information in the BIOS setting information (S55).

The setup unit 23 determines whether the fixation flag of the remote operation setting in the loaded lock-related setting information indicates ON (S56). When the fixation flag of the remote operation setting indicates ON (S56; YES), the setup unit 23 generates data of the BIOS screen to display the remote operation setting in the change impossible state. The setup unit 23 sends the generated BIOS screen data to the display controller 17 to display, on the display monitor, the BIOS screen (see FIG. 6) for displaying the remote operation setting in the change impossible state (S58).

Figure 6:
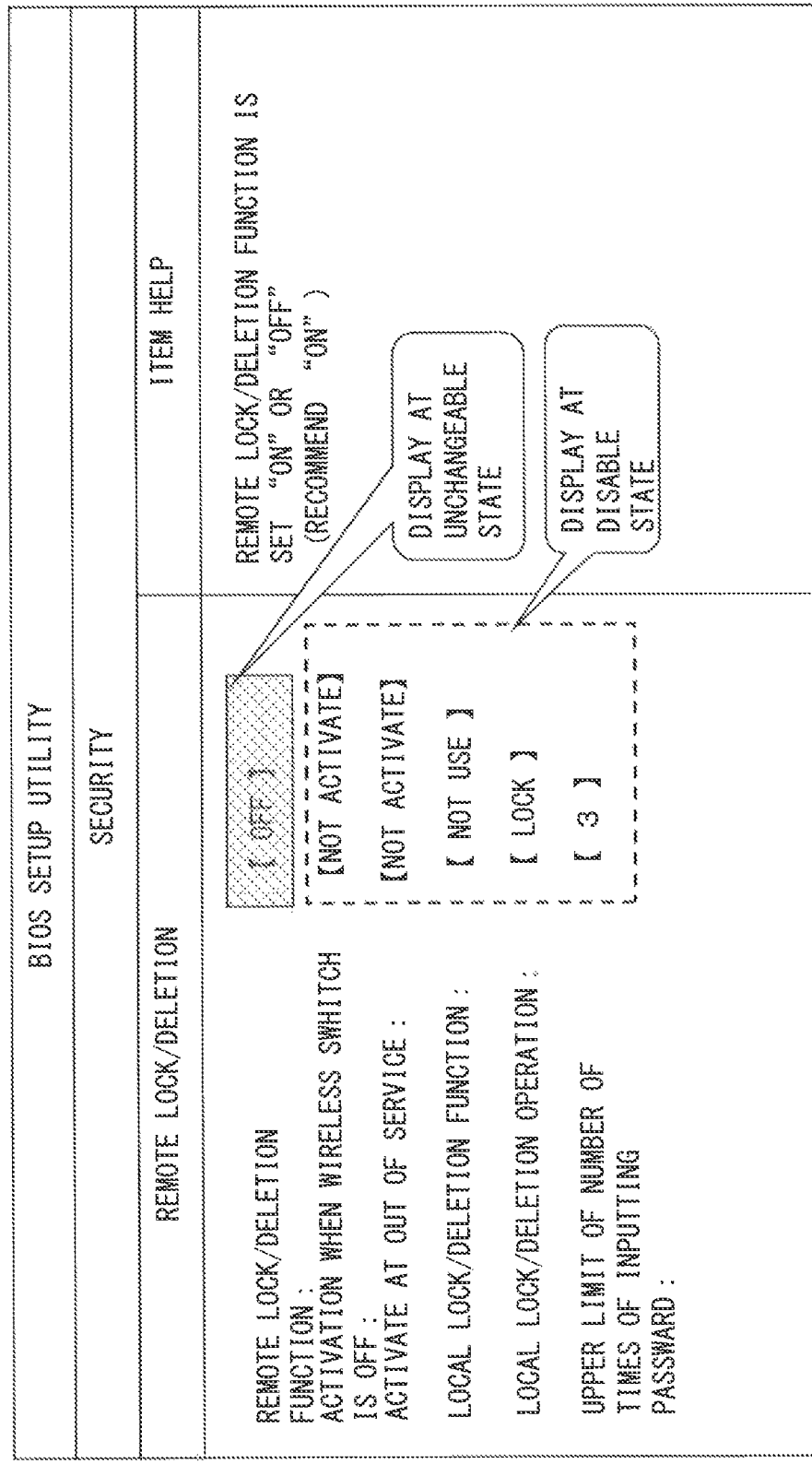

FIG. 6 is a diagram illustrating an example of the BIOS screen when the fixation flag is ON. As illustrated in FIG. 6, when the fixation flag of the remote operation setting is set to ON, the remote operation setting (remote lock/deletion function setting) is displayed on the BIOS screen in the change impossible state. The fixation flag can indicate ON only when the remote operation disable fixation command is issued. Therefore, when the fixation flag indicates ON, the remote operation setting in the OFF state is displayed on the BIOS screen in the change impossible state, and the other lock-related settings are displayed in a disable state (gray display state).

When the fixation flag of the remote operation setting indicates OFF (S56; NO), the setup unit 23 further determines whether the lock flag of the remote operation setting indicates ON (S57). When the lock flag of the remote operation setting indicates ON (S57; YES), the setup unit 23 generates data of the BIOS screen to display the loaded lock-related setting information in the change impossible state. The setup unit 23 sends the generated BIOS screen data to the display controller 17 to display, on the display monitor, the BIOS screen (see FIG. 7) for displaying the lock-related setting information in the change impossible state (S58).

Figure 7:
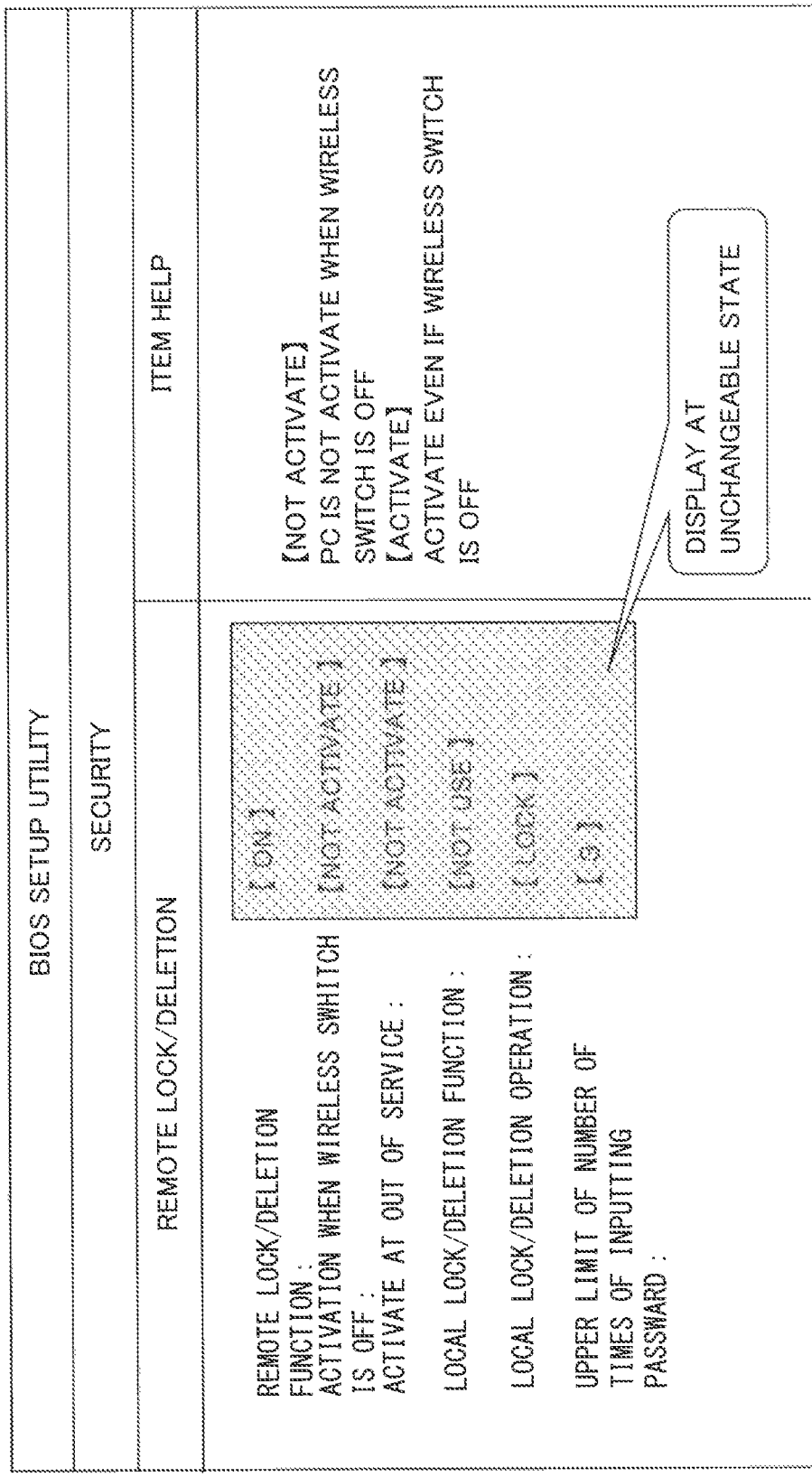

FIG. 7 is a diagram illustrating an example of the BIOS screen when the fixation flag is OFF and the lock flag is ON. As illustrated in FIG. 7, when the fixation flag is set to OFF and the lock flag is set to ON, the lock-related settings are displayed on the BIOS screen in the change impossible state. The lock flag indicates ON when the remote operation setting is ON. Therefore, when the fixation flag indicates OFF and the lock flag indicates ON, the remote operation setting and the other lock-related settings in the ON state are displayed on the BIOS screen in the change impossible state.

When the fixation flag of the remote operation setting indicates OFF (S56; NO) and the lock flag of the remote operation setting indicates OFF (S57; NO), the setup unit 23 generates data of the BIOS screen to display the loaded lock-related setting information in a normal state (change possible state). The setup unit 23 sends the generated BIOS screen data to the display controller 17 to display, on the display monitor, the BIOS screen (see FIG. 8) for displaying the lock-related setting information in the change possible state (S59).

Figure 8:
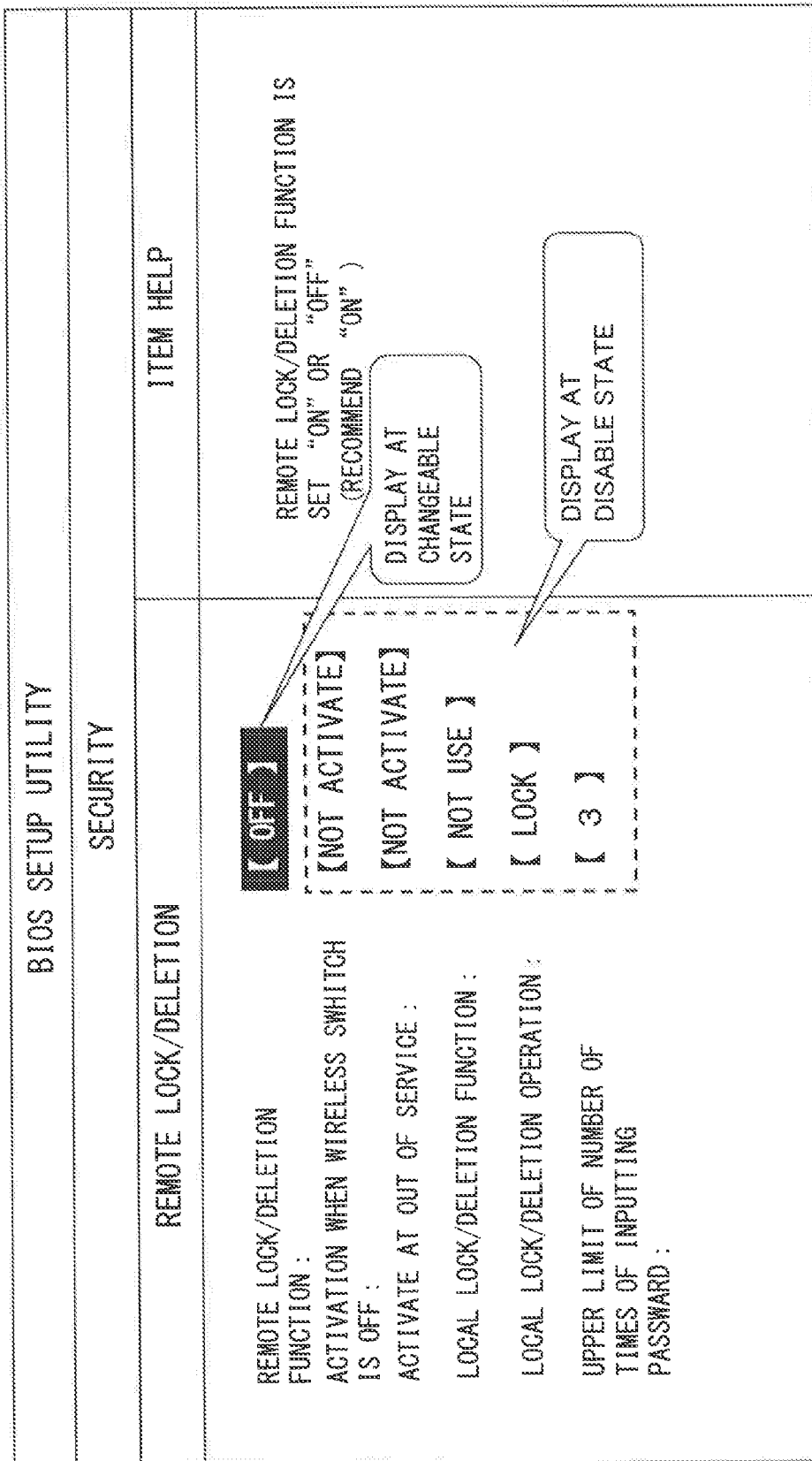
FIG. 8 is a diagram illustrating an example of the BIOS screen when the fixation flag is OFF and the lock flag is OFF.

FIG. 8 is a diagram illustrating an example of the BIOS screen when the fixation flag is OFF and the lock flag is OFF. As illustrated in FIG. 8, when the fixation flag is set to OFF and the lock flag is set to OFF, the lock-related settings are displayed on the BIOS screen in the normal state. The lock flag indicates OFF when the remote operation setting is OFF. Therefore, the remote operation setting in the OFF state is displayed on the BIOS screen in the change possible state, and the user can change the remote operation setting to the ON state. When the remote operation setting is changed to the ON state, the change is reflected on the BIOS setting information. When the remote operation setting is changed to the ON state, the lock flag is changed to ON. Therefore, the state of the remote operation setting is not allowed to change on the BIOS screen hereafter.

[Advantageous Effects of Embodiment 1]

In the embodiment 1, the BIOS setting information stored in the non-volatile memory 14 is displayed on the BIOS screen generated by the setup unit 23 of the BIOS 20, in the change possible state. As a result, the user of the computer 1 in the embodiment 1 can change desired setting information to a desired value.

However, when the remote operation setting is set to ON, the setup unit 23 sets the lock flag to ON to display the remote operation setting on the BIOS screen in the change impossible state. Conversely, when the remote operation setting is set to OFF, the setup unit 23 sets the lock flag to OFF to display the remote operation setting on the BIOS screen in the normal state.

Therefore, although the user of the computer 1 in the embodiment 1 can change the remote operation setting from OFF to ON on the BIOS screen, the user is not allowed to change the remote operation setting from ON to OFF. As a result, the manager who has the operational policy of enabling the remote operation functions can hand over the computer 1 to the user in the state that the remote operation setting is set to ON, and the manager can prevent the user from changing the remote operation setting. Obviously, the user can change the other BIOS settings from the BIOS screen, and the user may not depend on the manager for the management of the computer 1.

On the other hand, in the computer 1 of the embodiment 1, when the communication control unit 15 receives the remote operation command transmitted from another computer such as the server apparatus 7, at least the remote operation setting in the BIOS setting information is changed according to the content of the remote operation command. Specifically, the remote operation setting disable command is transmitted from the server apparatus 7, and the remote operation setting included in the BIOS setting information of the computer 1 is set to OFF (disabled).

In this way, according to the embodiment 1, the manager can transmit the remote operation disable command from the server apparatus 7, and the manager can change, from ON to OFF, the remote operation setting that is not allowed to change from the BIOS screen. Furthermore, when the remote operation setting is set to OFF, the user can change the setting of the remote operation setting to ON from the BIOS screen.

Therefore, according to the embodiment 1, the manager can appropriately manage the remote operation setting even if the user takes charge of the BIOS setting of the computer 1.

Furthermore, in the first embodiment, when the communication control unit 15 receives the remote operation disable fixation command, the state of the remote operation setting is set to OFF and the fixation flag is set to ON. As a result, the lock-related settings are displayed in the change impossible state on the BIOS screen displayed by the setup unit 23 when the fixation flag is set to ON.

As a result, the manager can transmit the remote operation disable fixation command to prohibit changing the remote operation setting in the OFF state. This is effective in fixing the setting information related to the function as a target of contract to "disabled" after the end of the contract period, for example.

[Modified Example]

In the embodiment 1, the remote operation setting includes the lock flag as illustrated in FIG. 2. However, since the lock flag is linked to the state data of the remote operation setting, the lock flag may not be included. In this case, the lock flag is omitted in the data structure example of the BIOS setting information illustrated in FIG. 2.

Figure 9:
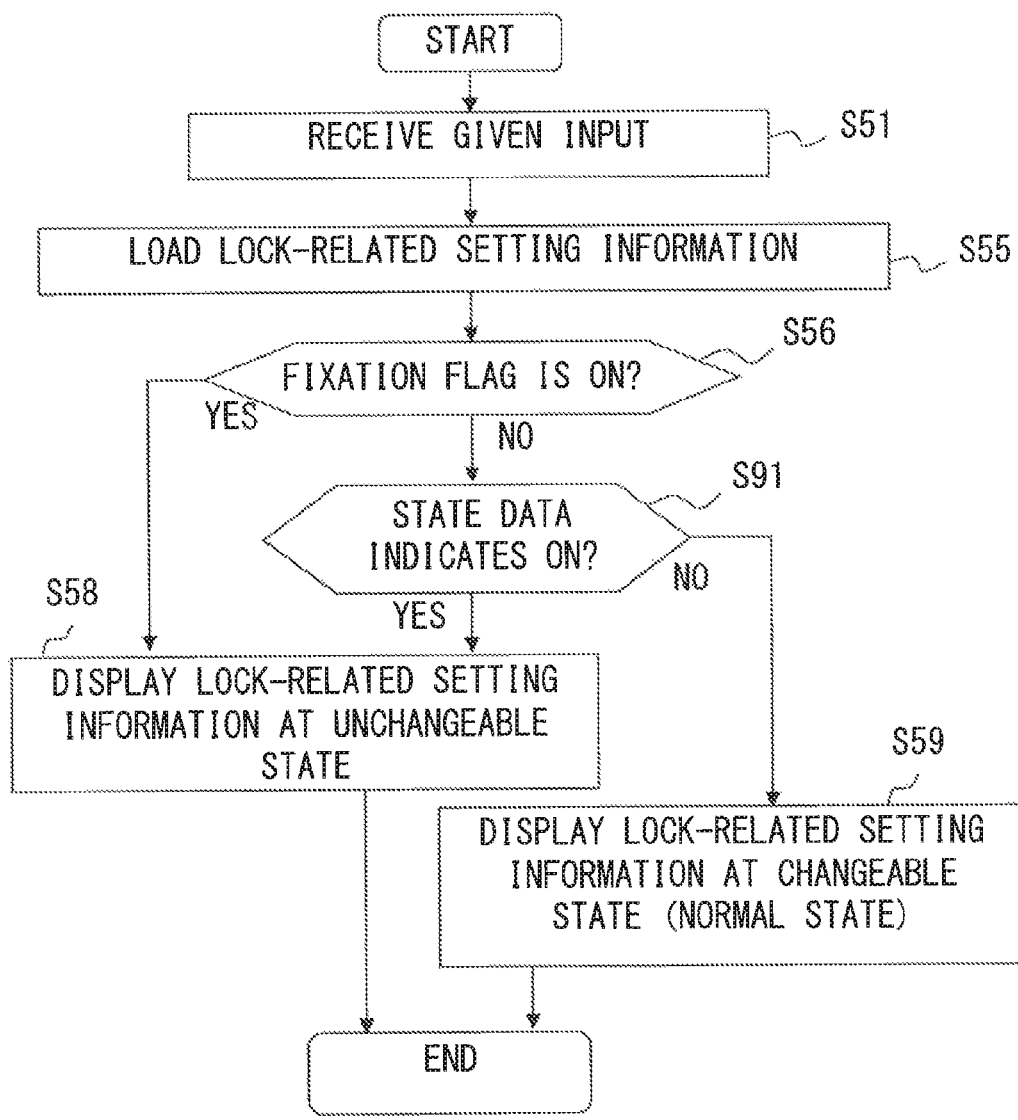
FIG. 9 is a flow chart illustrating a modified example of the operation at the BIOS screen activation.

FIG. 9 is a flow chart illustrating a modified example of the operation at the BIOS screen activation. In the modified example, the setting process of the lock flag of the remote operation setting (S52, S53, and S54) is omitted from the flow chart illustrated in FIG. 5, and the determination process of the lock flag (S57) is replaced by a determination process of the state data of the remote operation setting (S91). More specifically, the setup unit 23 can switch the display state of the lock-related settings based on the state data of the remote operation setting.

Although the embodiment 1 has illustrated the example of changing the remote operation setting by the remote operation command, the BIOS settings other than the remote operation setting may be changed by the remote operation command, and the change possible state and the change impossible state of the BIOS settings may be switched.

Although the fixation flag is included in the remote operation setting in the embodiment 1, the fixation flag may not be included. In this case, the remote operation disable fixation command is also not supported.

Although the BIOS setting information is the target of management in the embodiment 1, any setting information in the computer 1 can be the target of management instead of the BIOS setting information.

Although the BIOS is the target program in the embodiment 1, another program for executing similar processing may be the target program. For example, such a program may be a program like an Extensible Firmware Interface (EFI).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
    a storage to store first setting information and second setting information having a valid state or an invalid state of a remote operation of the first setting information;
    a communication controller to receive a command related to the first setting information transmitted from a network;
    a first controller to change the first setting information stored in the storage based on the command received by the communication controller; and
    a second controller to change at least one of the first setting information and the second setting information stored in the storage unit based on an input from a user using a setting screen displayed by a display unit,
    wherein the second controller controls the display unit so that the display unit displays the setting screen in a mode that the second setting information is unable to change into the invalid state of the remote operation by an input from a user when the second setting information has the valid state of the remote operation of the first setting information, and
    the second controller controls the display unit so that the display unit displays the setting screen in a mode that the second setting information is able to change into the valid state of the remote operation by an input of a user when the second setting information has the invalid state of the remote operation of the first setting information.

2. The information processing apparatus according to claim 1, wherein:
    the storage further stores attached information related to the second setting information;
    the first controller changes the second setting information stored in the storage into the invalid state of the remote operation, and changes the attached information into a given value based on the command received by the communication controller; and
    when the attached information stored in the storage indicates the given value, the second controller controls the display unit so that the display unit displays the setting screen in the mode that the second setting information having the invalid status is unable to change into the valid status regardless of whether the second setting information has the invalid state or not.

3. The information processing apparatus according to claim 1, wherein the first controller and/or the second controller cause the communication controller to stop operation when the second setting information is set to the invalid state.

4. A setting information management method executed by an information processing apparatus, the method comprising:
    receiving, by using a communication controller, a command related to first setting information stored in a storage from a network, wherein the storage stores the first setting information and second setting information having a valid state or an invalid state of a remote operation of the first setting information;
    changing, by using a first controller, the first setting information based on the command;
    changing, by using a second controller, at least one of the first setting information and the second setting information based on an input from a user using a setting screen displayed by a display unit;
    displaying, by using the display unit, the setting screen in a mode that the second setting information is unable to change into the invalid state of the remote operation by an input from a user when the second setting information has the valid state of the remote operation of the first setting information; and
    displaying, by using the display unit, the setting screen in a mode that the second setting information is able to change into the valid state of the remote operation by an input of a user when the second setting information has the invalid state of the remote operation of the first setting information.

5. A non-transitory computer readable medium storing a program executed by an information processing apparatus, the program comprising instructions of:
    receiving a command related to first setting information stored in a storage from a network, wherein the storage stores the first setting information and second setting information having a valid state or an invalid state of a remote operation of the first setting information;
    changing the first setting information based on the command;

changing at least one of the first setting information and the second setting information based on an input from a user using a setting screen displayed by a display unit;

displaying, by using the display unit, the setting screen in a mode that the second setting information is unable to change into the invalid state of the remote operation by an input from a user when the second setting information has the valid state of the remote operation of the first setting information; and displaying, by using the display unit, the setting screen in a mode that the second setting information is able to change into the valid state of the remote operation by an input of a user when the second setting information has the invalid state of the remote operation of the first setting information.

* * * * *